May 28, 1935.  I. DOROGI ET AL  2,002,527
METHOD OF SECURING A PREFORMED AND CONTINUOUS SHEET OF
UNVULCANIZED RUBBER TO A PORTION OF A FABRIC UPPER
Filed May 25, 1933
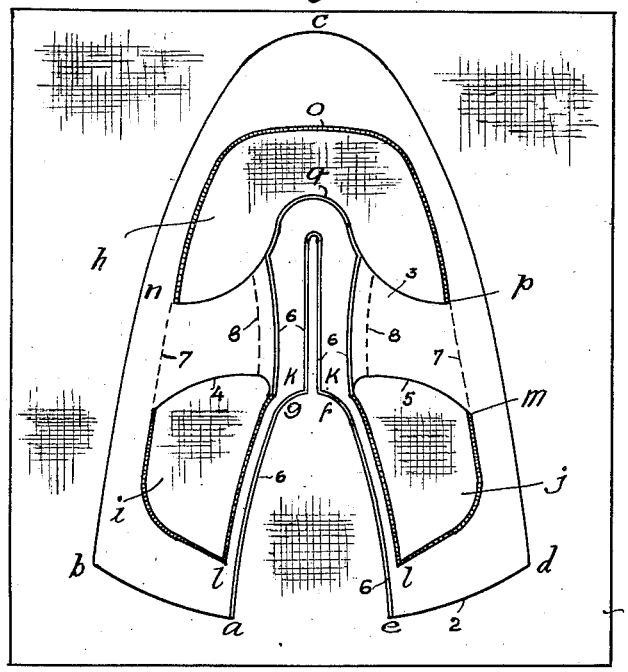
Fig. 1
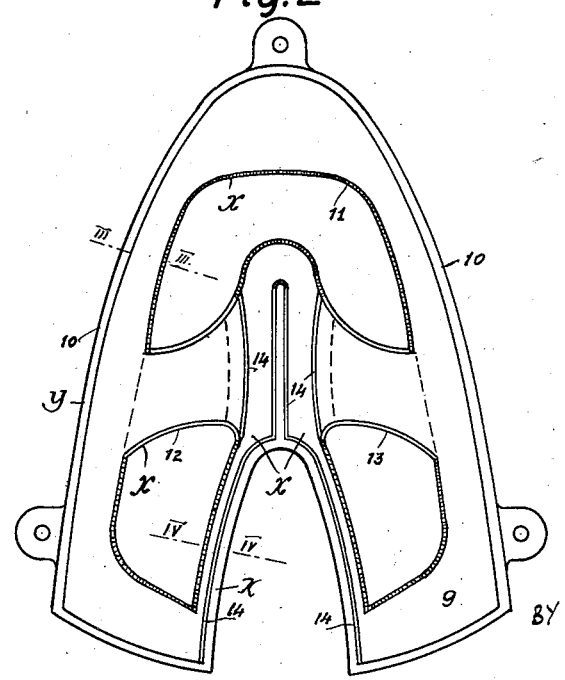
Fig. 2
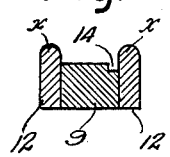
Fig. 3
Fig. 4
Istvan Dorogi
Lajos Dorogi
INVENTORS
BY Mock & Blum
ATTORNEYS Patented May 28, 1935

2,002,527

UNITED STATES PATENT OFFICE 2,002,527

METHOD OF SECURING A PREFORMED AND CONTINUOUS SHEET OF UNVULCANIZED RUBBER TO A PORTION OF A FABRIC UPPER

István Dorogi and Lajos Dorogi, Budapest, Hungary, assignors to Magyar Ruggyantaarugyár Részvénytársaság, Budapest, Hungary Application May 25, 1933, Serial No. 672,853
In Austria January 31, 1933

4 Claims. (Cl. 18—59)

Heretofore, it has been customary to affix previously shaped rubber members to fabric, by means of an adhesive. This has been common practice in affixing rubber covering members to the uppers of sport shoes. However, the adhesive spread beyond the edge of the rubber covering was very objectionable.

It has also been proposed to friction rubber covering material into the uppers of shoes, by means of rollers, whose peripheral turning speed exceeded the speed of movement of the fabric which was fed to said rollers. However, such rollers spread the rubber along the entire surface of the fabric, so that the frictioning roller could not be used for producing a rubber covering having a predetermined shape, especially when a part of the upper was to remain exposed.

According to our invention, a piece of canvas from which the upper is to be made, and an unvulcanized rubber sheet, are applied to each other in flat or planar form. Said applied sheets are pressed between a suitable support or platen, and a tool or die member which has blunt pressing edges which are shaped so as to correspond to the outline along which the applied sheets are to be connected. These blunt edges are forced through the rubber, under suitable pressure and temperature conditions, without cutting the fabric, which is compressed by said pressing edges. Hence the heat and pressure are initially applied at the margins of the portion of the upper which are to be exposed. The hot plastic rubber is thus forced under high pressure into the interstices of the fabric. The pressure edges define closed chambers when they are pressed against the fabric. The rubber which is free from the pressure of the die prevents the rubber which is being directly pressed, from creeping laterally. All the rubber which remains to be connected to the fabric is pressed into the interstices of the fabric, after the initial pressure has been applied at said margin. Since high pressure is utilized, sharp relief or embossed patterns can be formed.

The invention is hereafter described with reference to the accompanying diagrammatic drawing, in which:—

Figure 1 is a plan view showing the completed upper of a sports shoe,

Figure 2 is a top plan view of the tool affixing a rubber sheet to the fabric of the upper, Figures 3 and 4 are sections along the lines III—III and IV—IV, Figure 2, on an enlarged scale.

The fabric 1 of the upper is ordinarily a strong and closely woven canvas. As shown in Figs. 2–4, the tool or die 9 has protruding pressing edge members 11, 12, 13, having the blunt edges x. Said tool also has the protruding edge member 10, having the pressure edge y. The contour of the member 11, corresponds to the area n, o, p, q of Fig. 1, in which area the canvas is exposed. The contours of each of the edge members 12 and 13, corresponds to the areas k, l, m, of Fig. 1, in which areas defined by the points the canvas is also exposed. Hence the canvas is exposed along closed areas, h, i, j.

The edge members 10, 11, 12, 13 may be integral with the body of the tool 9. The edge member 10 may have a cutting edge, so as to cut the upper out of the sheet of fabric 1. The edges k, l, and l, m, of the rubber sheet 2 may be corrugated by the heat and pressure, the corresponding parts of edge members 12 and 13 being suitably shaped for this purpose. The edges n, o, p, can be likewise fluted or corrugated.

The edges a, g, f, e, are provided with strengthening ribs, by means of the groove or depression 14 of the tool 9.

A sheet of unvulcanized or slightly vulcanized rubber having a thickness of about 0.3–1.2 mm. is placed on the tool and the textile fabric is then placed on the rubber. Thereupon a pressing plate is applied to the fabric, under suitable pressure, which pressure should be from 35–40 kgs. per square cm. of the tool surface. The pressing plate or platen is heated, e. g. for example to a temperature of 30–40° C., or even higher so that the rubber is more easily forced into the meshes of the fabric. After withdrawing the pressing plate the product is taken off and freed from the rubber waste. Should less plastic rubber sheets be used a layer of plastic rubber is placed between the rubber sheet and the fabric which connects the sheet with the fabric when pressure is applied.

The fabric upper which is thus united with the rubber covering may be stamped out after the application of the covering or simultaneously with the application of the covering. If the edges of the fabric and of the covering are to coincide, the edge member 10 for stamping out the rubber and canvas sheets can be provided with a sharp edge.

According to the invention the product may be obtained by a mechanical process in a single working operation. If the connection of the rubber covering with the fabric is to be effected by adhesive and pressure, then the fabric is spread with an adhesive at the required places before applying the rubber sheet. Solutions of rubber, rubber like resins and other tacky rubber compositions may be used as adhesives.

Having now particularly described and ascertained the nature of our said invention and in what manner the same is to be performed, we declare that what we claim is:—

1. A method of securing a preformed and continuous sheet of unvulcanized rubber to a portion of the fabric upper of a shoe so that part of said upper remains exposed, which consists in pressing the preformed rubber sheet substantially in a single direction which is perpendicular to the fabric sheet of which the upper is made and while said sheets are substantially flat, and while the rubber is heated, the pressure being directly applied to the rubber along and within a line which follows the margin of the part of the upper which is to be exposed, the heat and pressure being sufficient to drive the rubber into the fabric, the fabric remaining uncut at the margin of its exposed part, and removing the waste rubber which corresponds to the part of the upper which is to be exposed.

2. A method of securing a preformed and continuous sheet of unvulcanized rubber to a portion of the fabric upper of a shoe so that part of said upper remains exposed, which consists in pressing the preformed rubber sheet substantially in a single direction which is perpendicular to the fabric sheet of which the upper is made and while said sheets are substantially flat, and while the rubber is heated, the pressure being directly applied to the rubber along and within a line which follows the margin of the exposed part of the upper, the heat and pressure being sufficient to drive the rubber into the fabric, the fabric remaining uncut at the margin of its exposed part, said part of the upper which is to be exposed including at least one exposed area, and removing the waste rubber which corresponds to the part of the upper which is to be exposed.

3. A method of securing a preformed and continuous sheet of unvulcanized rubber to a portion of the fabric upper of a shoe so that part of said upper remains exposed, which consists in pressing the rubber sheet substantially in a single direction which is perpendicular to the fabric sheet of which the upper is made and while said sheets are substantially flat, and while the rubber is heated, the pressure being directly applied to the rubber along and within a line which follows the margin of the part of the upper which is to be exposed, the heat and pressure being sufficient to drive the rubber into the fabric, the fabric remaining uncut at the margin of its exposed part, and simultaneously cutting the rubber and fabric at their outer margins, and removing the waste rubber which corresponds to the part of the upper which is to be exposed.

4. A method of securing a preformed and continuous sheet of unvulcanized rubber to a portion of the fabric upper of a shoe, which consists in pressing the preformed rubber sheet substantially in a single direction which is perpendicular to the fabric sheet of which the upper is made and while said sheets are substantially flat, while initially exerting said pressure uniformly along a line which follows the margin of the part of the upper which is to be exposed and then exerting said pressure upon the remainder of the rubber sheet, while simultaneously heating the rubber so that it is plastic, the pressure being sufficient to press the plastic rubber into the interstices of the fabric, and removing the waste rubber which corresponds to the part of the upper which is to be exposed.

ISTVÁN DOROGI.
LAJOS DOROGI.

Certificate of Correction

Patent No. 2,002,527.

May 28, 1935.

ISTVÁN DOROGI AND LAJOS DOROGI

It is hereby certified that the above numbered patent was erroneously issued to "Magyar Ruggyantaarugyár Részvénytársaság" as assignee of the entire interest in said invention whereas said patent should have been issued to the inventors and Magyar Ruggyantaarugyár Részvénytársaság, as assignee of one-half interest only as shown by the records of assignments in this office, and that the said Letters Patent should be read with this correction therein that the same may conform to the record of the case in the Patent Office.

Signed and sealed this 23d day of July, A. D. 1935.

[SEAL]

LESLIE FRAZER,
*Acting Commissioner of Patents.*